(12) United States Patent
Dharmarajan et al.

(10) Patent No.: US 8,263,722 B2
(45) Date of Patent: Sep. 11, 2012

(54) PROCESS FOR MAKING ETHYLENE INTERPOLYMERS AND INTERPOLYMERS MADE THEREBY; COMPOSITIONS AND ELECTRICAL DEVICES CONTAINING SUCH INTERPOLYMERS

(75) Inventors: Narayanaswami Raja Dharmarajan, Houston, TX (US); Rui Zhao, Houston, TX (US); Bruce Allan Harrington, Houston, TX (US); George James Pehlert, Houston, TX (US); Periagaram S. Ravishankar, Kingwood, TX (US); Kent L. Chasey, Houston, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 1313 days.

(21) Appl. No.: 11/086,108

(22) Filed: Mar. 21, 2005

(65) Prior Publication Data
US 2005/0215737 A1    Sep. 29, 2005

Related U.S. Application Data

(60) Provisional application No. 60/555,914, filed on Mar. 24, 2004, provisional application No. 60/611,963, filed on Sep. 22, 2004.

(51) Int. Cl.
| | |
|---|---|
| *C08F 210/16* | (2006.01) |
| *C08F 4/6392* | (2006.01) |
| *C08F 4/647* | (2006.01) |
| *H01B 3/28* | (2006.01) |

(52) U.S. Cl. ........ 526/348; 526/134; 526/170; 526/281; 525/240; 524/570; 174/110 SR; 174/110 AR; 174/110 PM

(58) Field of Classification Search .................. 526/134, 526/170, 348; 525/240; 524/570; 174/110 SR, 174/110 AR, 110 PM
See application file for complete search history.

(56) References Cited

U.S. PATENT DOCUMENTS

| | | | |
|---|---|---|---|
| 5,236,998 A | 8/1993 | Lundeen et al. | ................ 525/52 |
| 5,674,613 A | 10/1997 | Dharmarajan et al. | |
| 5,763,533 A * | 6/1998 | Dharmarajan et al. | ....... 525/211 |
| 5,952,427 A | 9/1999 | Dharmarajan et al. | |
| 6,150,467 A | 11/2000 | Dharmarajan et al. | |
| 6,255,410 B1 | 7/2001 | Shigekauzu et al. | ............ 526/68 |
| 6,270,856 B1 | 8/2001 | Hendewerk et al. | .......... 427/487 |
| 6,271,311 B1 | 8/2001 | Ravishankar et al. | |
| 6,300,433 B1 | 10/2001 | Rodriguez et al. | ............ 526/127 |
| 6,376,610 B1 | 4/2002 | Dharmarajan et al. | |
| 2001/0023231 A1 * | 9/2001 | Sacchetti et al. | .............. 502/117 |

FOREIGN PATENT DOCUMENTS

| | | |
|---|---|---|
| EP | 0 608 369 | 5/1997 |
| EP | 0 843 878 | 5/1998 |
| EP | 0 495 099 | 6/1998 |
| WO | WO 93/25590 | 12/1993 |
| WO | WO 94/06858 | 3/1994 |
| WO | WO 97/22635 | 6/1997 |
| WO | WO 97/32922 | 9/1997 |
| WO | WO 98/56012 | 12/1998 |
| WO | WO 99/41294 | 8/1999 |
| WO | WO 99/45041 | 9/1999 |
| WO | WO 99/51648 | 10/1999 |
| WO | WO 00/37514 | 6/2000 |
| WO | WO 02/34795 | 5/2002 |
| WO | WO 03/000740 | 1/2003 |
| WO | WO 03/000740 A2 * | 1/2003 |

OTHER PUBLICATIONS

Rubber World, vol. 226, No. 2, pp. 39 to 50, Pehlert et al., entitled "EPDM-Metallocene Plastomer Blends for W&C", 2002.
Ravishankar, P.S. et al., "Advanced EPDM for Wire and Cable Applications," Rubber World, vol. 219, No. 3, pp. 23-30 (1998).

* cited by examiner

*Primary Examiner* — Roberto Rabago
(74) *Attorney, Agent, or Firm* — Hsin Lin; Leandro Arechederra, III

(57) ABSTRACT

The invention relates to a continuous polymerization process for preparing a random ethylene interpolymer with propylene and/or 1-butene which comprises:
  (A) polymerizing ethylene, and as an α-olefin comonomer propylene and/or 1-butene under continuous random polymerization conditions in the presence of single site catalyst system employing an ionic activator having cyclic ligands shielding a central charge bearing atom, at a temperature of 140° C. to 250° C. at a conversion of ethylene of 80 to 99% and a comonomer conversion of from at least 30% and
  (B) devolatilizing the polymer to provide an ethylene copolymer having a density of from 0.85 to 0.92 g/cm$^3$, an MI of from 0.01 to 100 g/10 min, preferably from 0.1 to 20, and an $I_{21}/I_2$ of from 30 to 400.

The invention also relates to polymers made by such processes containing as α-olefin comonomer propylene and/or 1-butene, having a density of from 0.85 to 0.92 g/cm$^3$, an MI of from 0.01 to 100 g/10 min and an $I_{21}/I_2$ of from 30 to 400 obtained by solution polymerization using a transition metal complex as a catalyst and a non-coordinating anion to provide a level of NCA derived residue, as determined by boron content, less than 0.5 ppm. as determined by ICP, preferably undetectable by ICP. The polymers may be blended with EP rubber elastomers and be used for electrical cable insulation.

25 Claims, 3 Drawing Sheets

FIGURE 1 : VARIATION OF DISSIPATION FACTOR WITH TIME IN 90 °C WATER

FIGURE 2 : VARIATION OF COMPOUND VISCOSITY WITH SHEAR RATE

Test Temperature = 125 °C

PROCESS FOR MAKING ETHYLENE INTERPOLYMERS AND INTERPOLYMERS MADE THEREBY; COMPOSITIONS AND ELECTRICAL DEVICES CONTAINING SUCH INTERPOLYMERS

This application claims priority from U.S. Provisional Patent Application having Ser. No. 60/555,914 filed on Mar. 24, 2004, and priority from U.S. Provisional Patent Application having Ser. No. 60/611,963 filed on Sep. 22, 2004.

FIELDS OF INDUSTRIAL APPLICATION

The invention relates processes for making ethylene interpolymers and the polymers that can be made by such processes as well as electrical devices containing such interpolymers. The invention relates especially, but not exclusively, to processes for making ethylene interpolymers at relatively high polymerization temperatures of over 100° C. in order to form polymers with high levels of long chain branches (LCB); and especially such polymers having a relatively low density and a moderate molecular weight that are processable as a thermoplastic material. The high LCB can be expressed in terms of a Melt Index Ratio (MIR) of melt viscosities measured under different loads. The invention also relates to electrical devices having an insulating layer of the interpolymer or compositions containing such interpolymer such as electrical cables.

BACKGROUND FOR INTERPOLYMER POLYMERIZATION

Lower density ethylene interpolymers with moderate molecular weights will be referred herein as plastomers. Plastomers have been made with catalyst systems based on Ziegler-Natta vanadium catalysts using aluminum alkyl based activators. Such polymers have high levels of regio-inversion for the insertion of the propylene comonomer. The low activity of the catalyst leads to the need to de-ash the polymer to remove vanadium residues, especially for if the polymer is to be used for electrical applications. Propylene and 1-butene have been used as comonomers to provide short chain branching (SCB) in Ziegler-Natta produced plastomers. More recently metallocene based single site catalysts have been identified to make plastomers in a continuous solution process at higher temperatures and at higher activities where activity is defined as the amount of polymer produced per amount of transition metal single site catalyst component.

It has been recognized that metallocene based catalyst systems produce terminal unsaturation by, for example, beta-hydride elimination. It has been recognized that for many metallocene based processes the unsaturated chain end may incorporate in a growing chain and form long chain branches (LCB). EP495099 (Mitsui) and EP608369 (Dow) describe processes proving indications of LCB formation through increased shear sensitivity of the polymer, a recognized effect provided by LCB.

EP495099 uses a hafnocene in conjunction with alumoxane as an activator. In the examples 1-octene, 1-butene and propylene were used as a comonomer for batch polymerization at temperatures less than 100° C. providing polymers with high MIR values. Extensive depletion of comonomer in batch type reactions may favor LCB formation. The polymerization conditions however lead to significant levels of catalyst residues. The polymer produced at the end of the batch polymerization process may have a significantly different comonomer content than that produced early in the process and the polymer may have a broader compositional distribution.

In WO9941294/19Aug1999 and WO9945041/10Sep99 (issued as U.S. Pat. No. 6,291,609) processes using metallocene based single site catalysts are described in which the polymerization temperature is increased to above 100° C. by using hafnium as a transition metal and/or improved non-coordinating anionic activators (NCA). WO99/1294 does not combine the use of the improved catalyst system with propylene with a sufficiently low amount of diene. Polymerization is performed at 115° C. with a relatively low amount of propylene. There is no quantification of the LCB level. WO9945041 teaches the use of a bridged hafnocene activated by a tetra-aryl substituted anion, wherein each anion has at least two cyclic aromatic rings. In the examples octene-1 is used as a comonomer. Polymerization was at 170° C. for MI levels of from 0.49 to 3.6 g/10 min. WO9945041 does not teach the use of propylene as a comonomer at especially high temperature polymerization temperatures.

WO0234795 describes a plant, in which these processes can be practiced industrially and in which an advantageous arrangement is described for recycling unreacted monomers back to the polymerization reactor(s) after suitable purification through liquid phase separation, distillation and/or sieves. The above references are incorporated by reference for US purposes.

WO0037514 describes a gel-free, branched semi-crystalline ethylene propylene copolymer containing high levels of propylene. The polymerization temperature was less than 100° C. In the examples a bridged zirconocene is used with an NCA in a continuous polymerization reactor.

So that the recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

BACKGROUND FOR ELECTRICALLY INSULATING DEVICES

Figure 1:
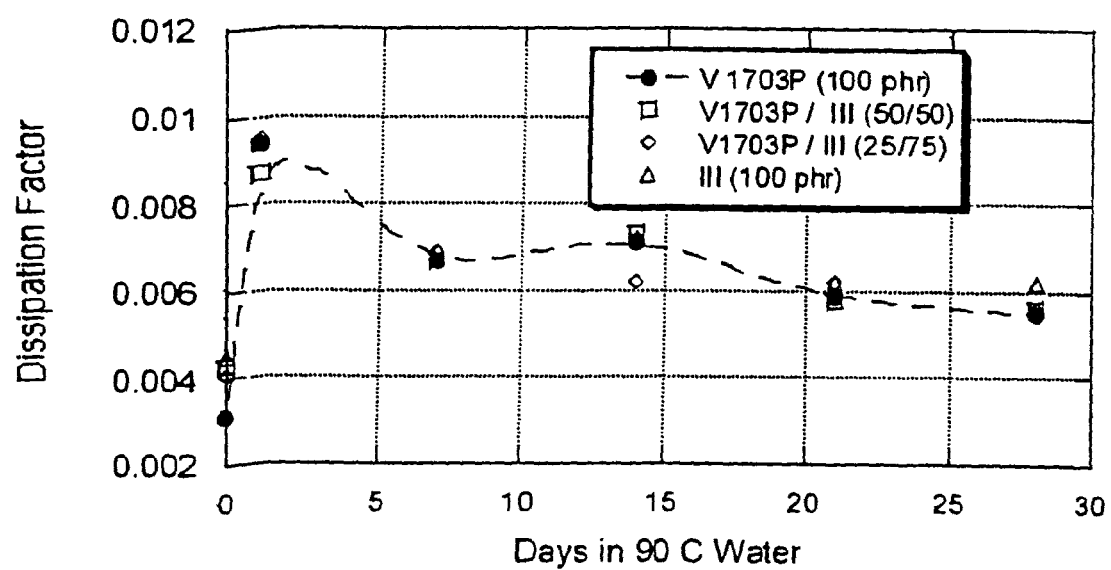
FIG. 1 shows the variation of a compound dissipation (or loss) factor versus time, according to one or more embodiments described.

Ethylene propylene co-polymers and EP(D)M terpolymers having polyethylene type crystallinity are commercially used in medium voltage electrical insulation compounds. These compounds are applied as an insulation member over either a metallic conductor or a semi-conductive substrate in a multi-step extrusion process. The cable containing the insulation is typically vulcanized in a continuous vulcanization (CV) tube by the application of steam and hot water. Cross-linking packages may use silanes or peroxides as the active cross-linking ingredient.

ExxonMobil Chemical recently commercialized a vanadium catalyzed EP(D)M polymer grade, Vistalon 1703P, for electrical applications using vinyl norbornene (VNB) as a termonomer, see EP843878. In other disclosures the EP-VNB is mixed with ethylene copolymers to aid cable manufacture, see U.S. Pat. No. 5,763,533 and WO9856012. The presence of VNB provides extensive long chain branching as evidenced by a Branching Index of less than 1 and the polymers have good processability. The vanadium catalyst has a low activity. The VNB derived units in the polymer provide good cross-linkability with peroxides, which enhances thermal stability. The polymers are de-ashed to remove at least partially, catalyst residues and anti-agglomeration additives to obtain reasonable electrical insulating properties. All of the above references are incorporated by reference for US purposes.

Metallocene catalyst based ethylene alpha-olefin copolymers also find limited application in electrical insulation compounds. Some ethylene-butene plastomer products made in a high-pressure process have been evaluated in insulation and semi-conductive formulations, see U.S. Pat. No. 6,270,856 (ExxonMobil, Hendewerk et al.) These polymers possess inherently good electrical insulating properties, but have a narrow molecular weight distribution (MWD) resulting in processability disadvantages. Other plastomers made in solution processes have some LCB for reasons explained above. However, these polymers may still be difficult to process and may have reduced electrical insulating properties WO03000740 (ExxonMobil, Pehlert) suggests the use of modified NCA's to improve dielectric loss properties. In one example ethylene-octene plastomers are produced at 140° C. WO9406858 discloses ethylene octene copolymers with moderate LCB. WO9732922 uses rheology-modification to increase branching levels. The resulting polymers have <0.5% gel, a composition distribution breadth index >50%, and an molecular weight distribution Mw/Mn<4.0. The above references are incorporated by reference for US purposes.

Alpha-olefin ethylene copolymers have been used in blends, especially with ethylene propylene vinyl norbornene terpolymers, see Rubber World, Volume 226, No. 2, pages 39 to 50.

It is among the aims of the invention to provide improved interpolymers which possess a high level of long chain branching at desirable levels of MI and with low impurity levels; and catalyst and process conditions to provide such interpolymers under continuous polymerization conditions, preferably without post-treatments, with an improved balance of properties, in particular the balance between processability and impurity levels, especially but not exclusively for use in electrical insulating applications.

SUMMARY

In a first aspect of the invention there is provided a continuous polymerization process for preparing a random ethylene interpolymer which comprises the steps of:
(A) polymerizing ethylene, and an α-olefin comonomer selected from the group consisting of propylene and 1-butene and mixtures thereof under continuous random polymerization conditions in the presence of single site catalyst system employing an ionic activator having cyclic ligands shielding a central charge bearing atom, at a temperature of 140° C. to 250° C. at a conversion of ethylene of 80 to 99% and a comonomer conversion of from 20 to 80%; and
(B) devolatilizing the polymer to provide an ethylene copolymer having a density of from 0.85 to 0.92 g/cm$^3$, an MI of from 0.1 to 20 g/10 min and an MIR ($I_{21}/I_2$) of from 30 to 200.

Generally speaking, $I^{21}/I^2$ values are a function of MI and at low MI value high values of MIR ($I^{21}/I^2$) are possible. The comonomer conversion may be less than 60% and the MIR ($I^{21}/I^2$) may be less than 180.

Under continuous polymerization conditions, the impact of catalyst poisons can be mitigated. The use of the lower α-olefin comonomers like propylene and butene are generally supplied from purer streams with lower catalyst poisons and permits higher polymerization activities. Higher activities result in lower catalyst residues in the final polymer product. Internal olefin by-products, made during higher alpha-olefin production, may negatively impact catalyst activity and lead to higher catalyst residues.

In the process increased conversion helps attain the desired increased $I^{21}/I^2$ attributable to the presence of long chain branches.

Advantageously the interpolymer contains at least 55 mol % of ethylene derived units, preferably at least 60 mol % and especially at least 65 mol %; from 0 to less than 10 mol % of an α-olefin comonomer other than propylene and/or 1-butene, preferably less than 5 mol %, and/or from 0 to less than 0.5 mol % and preferably less than 0.1 mol % of a diene. The predominance of ethylene and the use of lower α-olefin comonomer assist in efficient production of the desired highly processable polymer with reduced catalyst residue content.

The polymerization may be performed adiabatically using a catalyst system including a hafnocene having two cyclopentadienyl groups connected by a bridging structure, preferably a single atom bridge. The ionic activator preferably has at least two polycyclic ligands, especially at least partly fluorinated. The use of a highly active metallocene catalyst and substantially equimolar ionic activator may permit reduced catalyst residue, which in turn may improve the electrical insulating properties.

It is advantageous to maximize the reactor temperature and substantially eliminate the use of transfer agent such as hydrogen. The high temperature may improve the amount of LCB through better incorporation of vinyl terminated polymer chains formed earlier in the polymerization process. Chain transfer agents such as hydrogen can influence the termination mechanism to reduce the amount of vinyl unsaturation and discourage LCB formation. In such circumstances the heat of the polymerization reaction may raise the temperature by at least 100° C. between the feed for the continuous polymerization and the effluent to be devolatilized.

The polymerization may be preformed in a single reactor such as a continuous stirred tank reactor or the polymerization may be performed in a series reactor to provide a multi-modal molecular weight distribution, or a broad composition distribution.

In a further aspect of the invention, there is provided an ethylene interpolymer containing as α-olefin comonomer propylene and/or 1-butene, having a density of from 0.85 to 0.92 g/cm3, an MI of from 0.01 to 100 g/10 min and an MIR ($I^{21}/I^2$) of from 30 to 400 obtained by solution polymerization using transition metal complex as a catalyst and a non-coordinating anion to provide a level of NCA derived residue as determined by boron content less than 0.5 ppm as determined by ICP, preferably undetectable by ICP.

The polymer may display the same preferred polymer features as indicated when discussing the previous aspect. Preferably at an MI of from 0.01 to 0.55, MIR (I21/I2)>−90.9× MI+90. The MIR (I21/I2) is then suitably at least 45. Preferably at an MI of from 0.55 to 8, MIR (I21/I2)>−1.3× MI+40.7. Preferably at an MI of greater than 8, the MIR (I21/I2)>30.

The interpolymer may have specific MI ranges combined with specific high load/low load MI ratio ranges. Where the MI is from 0.01 to 0.30, I21/I2>−103.45×MI+91.0 and/or I21/I2<−103.45×MI+241.0. Where the MI is from 0.30 to 1.40, I21/I2>−18.18×MI+65.4 and/or I21/I2<−18.18×MI+215.4. Where the MI is from 1.40 to 8.0, I21/I2>−1.515×MI+42.1 and/or I21/I2<−1.515×MI+192.1. Where the MI is from 8.0 to 1000, I21/I2>30.0 and/or I21/I2<180.0.

The preferred process conditions, including catalyst selection, may be obtained using as the single site catalyst is a transition metal complex of a Group IV metal, preferably Zr or Hf, most preferably Hf. A level of single site residue as measured by the content of transition metal may be reached which is less than 2 ppm (parts per million), preferably less than 1 ppm as determined by ICP.

The density is suitably at least 0.85 and/or less than 0.9 and preferably at least 0.86 and/or less than 0.89. It is advantageous in electrical applications that the polymer contains from 0 to 0.1 wt % of an anti-agglomeration additive, such as a stearate salt.

In yet a further aspect the invention provides an electrical device comprising an electrical conductor and a polymeric insulating layer comprising a polymer with any one or more of the features indicated previously or resulting from the process indicated previously. Compositions may be used for the insulting layer including the polymer of the invention in combination with other polymers, fillers etc. as may be desired for the particular electrical application under consideration. Suitably the insulating layer is of a composition also comprising an ethylene propylene elastomer with a Mooney [(1+4) 125° C.] range of from 10 to 100 and optionally a diene. It is preferred that the elastomer is an ethylene-propylene-vinylnorbornene terpolymer, most preferably with a content of ethylene derived units of from 68-75 wt. %, a molecular weight distribution Mw/Mn of at least 5 and contains from 0.1 to 2.5 wt % of units derived from vinyl norbornene (VNB). Insulating layers may be obtained having a tensile strength of from 5 to 10 MPa min.; a break elongation of from 100 to 500% 150 to 450% and a dielectric constant of less than 4 or less than 5.

Low levels of catalyst residue may remain in the polymer. The polymerization conditions can be selected to provide a high conversion of the monomers in solution, so favoring the incorporation of vinyl terminated macromers, which thus go on to form LCB's. High conversions reduce the cost for recycling unconsumed monomer.

Because of higher alpha-olefins are not employed, accumulation of unsaturated or branched isomers of higher alpha-olefins can be avoided. The level of comonomer may be varied to target the desired density, melting point and heat of fusion. Preferably the density is at least 0.86, and/or preferably less than 0.9; above that which is usually applicable to EP copolymers made using vanadium catalysts.

The LCB content may be indirectly measured by the melt index ratio, MIR measured at MIR (I21/I2). Highly branched products have high MIR (I21/I2) and linear products have low MIR (I21/I2). Whereas substantially linear products may have moderate MIR (I21/I2) values around 12 to 17 as described in EP608369, and whereas typical commercial plastomers produced in solution may have MIR (I21/I2) values that are somewhat above that, the plastomer products of this invention have MIR (I21/I2) values around 40 to 60 and even as high as 80. The high LCB content of these materials improves processability in extrusion and especially in the demanding application of extruding wire and cable insulation. As a result post treatment of the polymer to induce branching, the use of branch forming diene comonomers and/or presence of processing aids may be reduced or even avoided. The high level of LCB leads to improved processing while the polymer at the same time has a higher filler holding capability, lower catalyst residues and lower dielectric power loss.

In general the process envelope for continuous solution polymerization reactor is limited by a number of mostly inter-related process aspects. If the catalyst activity is too low, the polymer will contain potential triggers for dielectric breakdown. Activity is conventionally expressed in terms of the amount of polymer produced per the amount of transition metal component consumed. Associated activators may be used at different molar ratios relative to the transition metal component. Thus for a full activity picture, the activity in terms of activator consumption per unit polymer produced may also be considered.

The level of long chain branching depends on the selection of the transition metal component and some process conditions such as temperature and the extent to which the monomer present is converted.

The choice of transition metal component and NCA may influence the chain growth and molecular weight. If the catalyst system and process conditions are selected to optimize molecular weight, higher operating temperature may be used to achieve a given MI. The higher operating temperature may increase the activity and/or permit higher polymer concentrations in the reactor and so higher productivity in terms of weight of polymer produced per unit time in a given size plant. The higher process temperature aids the incorporation of vinyl terminated macromers.

The level of branching is also influenced by the extent to which monomer is converted into polymer. At high conversions, where little monomer remains in the solvent, conditions are such that vinyl terminated chains are incorporated into the growing chains more frequently, resulting in higher levels of LCB. Catalyst levels may be adjusted to influence the level of conversion as desired.

The selection of a lower α-olefin comonomer influences polymerization kinetics and catalyst activity. Bridged bis-ligand metallocene structures can provide a catalytic site, which encourages incorporation of the larger comonomers. Smaller comonomers such as propylene and 1-butene can be incorporated more easily as well. As disclosed in WO9951648 it is believed that monomer feeds can accumulate non-polar impurities with a negative impact on activity.

By using catalyst systems that combine a propensity for providing a high molecular weight with high comonomer incorporation and avoiding or reducing the amount of higher α-olefins used as comonomer, it is possible to extend the operating envelope for polymerization to regions of high temperature and/or high monomer conversion to favor LCB formation so as to give MIR (I21/I2) in excess of 30 with catalyst activities based on grams of polymer produced per gram of transition metal compound consumed for continuous processes in excess of 200 000, possibly 400 000, or even above 600 000 for the target range of MI's suitable for thermoplastic processing such as extrusion in cable manufacture.

As to the NCA, it is most preferred to use a NCA whose charge bearing atom or atoms, especially boron or aluminum, are shielded by halogenated, especially perfluorinated, cyclic radicals, and especially polycyclic radical such as biphenyl and/or naphthyl radicals. Most preferably the NCA is a borate precursor having a boron atom shielded by four, perfluorinated polycyclic radicals. Selected metallocene-NCA combinations may assist in preserving higher molecular weights and/or higher operating temperatures. Thus they may be among the preferred catalyst for the interpolymers of the invention. By operating the continuous process in solution at unusually high process temperatures and/or monomer conversions, surprisingly high levels of LCB may be achieved.

Another advantage to using propylene as a comonomer in wire and cable applications pertains to its high filler holding capacity that is a result of the higher plateau modulus of the polymer relatively to higher alpha olefin copolymers. Copolymers with short side chains are less coiled and more extended. This higher radius of gyration leads to higher number of entanglements with neighboring chains and ultimately provides a means of the polymer mixing with and accepting higher levels of filler and additives. In some applications in wire and cable compounds, especially in low voltage areas, high filler content helps to reduce overall compound cost.

In yet a further aspect the invention provides an electrical device comprising an electrical conductor and a polymeric insulating layer comprising a polymer with any one or more of the features indicated previously or resulting from the process indicated previously. Compositions may be used for the insulting layer including the polymer of the invention in combination with other polymers, fillers etc. as may be desired for the particular electrical application under consideration. The insulating member comprising the polymer with the features described previously can be used in various wire an cable applications. These consist of low voltage, typically less than 5 kV, medium voltage, in the range of 5 kV to 69 kV and high voltage, describing range above 69 kV applications. The compounds in general comprise a reinforcing filler, such as calcined clay to provide mechanical properties and processability. The amount of filler used in the formulation depends on the type of application. Sometimes a flame retardant filler, such as magnesium hydroxide, is used in combination or replacing the calcined clay. The insulating member comprising the polymer with the features described above can also be used in flame retardant compound applications, wherein an inorganic filler containing water of hydration is used to provide flame retardant properties. Formulations for medium voltage applications are invariably formulated with lead oxide, that seemingly provides good electrical properties after aging. However, reduction or elimination of lead is desirable from environmental considerations. The insulating member comprising the polymer with features described previously can be used in compounds that are lead free or contain reduced amounts of lead. For high voltage applications, the formulations are designed without filler to minimize electrical loss. For such compounds, the polymer described previously can be used in combination with other polymers to furnish an unfilled compound that has adequate mechanical properties and processability. Suitably the insulating layer is of a composition also comprising an ethylene propylene elastomer with a Mooney [(1+4) 125° C.] range of from 10 to 100 and optionally a diene. It is preferred that the elastomer is an ethylene-propylene-vinyl norbornene terpolymer, most preferably with a content of ethylene derived units of from 68-75 wt. %, a molecular weight distribution Mw/Mn of at least 5 and contains from 0.1 to 2.5 wt % of units derived from vinyl norbornene (VNB). Insulating layers may be obtained having a tensile strength of from 5 to 10 MPa min.; a break elongation of from 150 to 450% and a dielectric constant of less than 4.

EXAMPLES

The invention is illustrated with reference to the Examples. In the Examples the different tests and measurements are performed according to the protocols below unless otherwise mentioned:

TABLE 1

| No | Test | Test Method | Units |
|----|------|-------------|-------|
| 1 | Ethylene and octene content of the polymers | ASTM D 3900 FTIR method See Note * | Wt. % |
| 2 | Mooney Viscosity | ASTM D 1646-94 | Mooney units |
| 3 | Scorch time | ASTM D 2084 - 93 | Min. |
| 4 | Cure Characteristics | ASTM D 2084-93 | DN · m |
|  | ML |  | DN · m |
|  | MH |  | Min |
|  | Ts2 |  | Min |
|  | T90 |  | DN · m/min |
|  | Cure Rate |  | DN · m |
|  | Cure State |  |  |
| 5 | Physical Properties | ASTM D 412-92 | MPa |
|  | 100% Modulus |  | MPa |
|  | 300% Modulus |  | MPa |
|  | Tensile Strength |  | % |
|  | Break Elongation |  |  |
| 6 | Heat Aging | ASTM D 572-88 | % |
| 7 | Extrusion Characteristics | As described later on in specification | G/min |
|  | Mass Rate |  | μm |
|  | Ra |  | μm |
|  | Rt |  |  |
| 8 | Electrical Power Loss | Dissipation factor in water @ 90° C., 60 Hz, and 600 V AC See Note ** |  |
| 9 | Melt Index and Melt Index Ratio (MIR) | ASTM D 1238 | MI g/10 min. MIR Dimensionless |
| 10 | Density | ASTM D 1505 98 | g/cm³ |
| 11 | ICP AES Internally Coupled Plasma Atomic Emissions Spectroscopy | See Note *** | ppm |

* 1-Octene is measured by reference to the 1387 cm-1 absorbence band of the FTIR spectrum.
** ASTM D-150-98
*** ICP-AES is a commercially available form of optical emission spectrometry with inductively coupled plasma. The plasma is formed by argon gas flowing through a radio frequency field where it is kept in a state of partial ionization; i.e. the gas contains electrically charged particles. This allows it to operate at very high temperatures of up to 10 000 C. At those conditions most elements emit light of characteristic wavelengths which can be measured and used to determine the concentration of particular elements.

The sample to be analyzed is introduced into the plasma as a fine droplet aerosol. Light from the different elements is separated into different wavelengths by means of a grating and is captured by light-sensitive detectors, one for each element being analyzed. This permits simultaneous analysis of up to 40 elements. The sensitivity is comparable to flame atomic absorption with detection limits typically at the 1 μg/L level in aqueous solutions.

Example 1

Polymerization

Copolymerizations were carried out in a single-phase, liquid-filled, stirred tank reactor with continuous flow of feeds to the system and continuous withdrawal of products under equilibrium conditions. All polymerizations were done in system with a solvent comprising predominantly C6 alkanes, referred to generally as "hexane" solvent, using soluble metallocene catalysts and discrete, non-coordinating borate anion as co-catalysts. An homogeneous dilute solution of tri-n-octyl aluminum in hexane was used as a scavenger in concentrations appropriate to maintain reaction. No transfer agents, such as hydrogen, were added to control molecular weight. Polymerizations were run at high temperatures and conversions to maximize macromer re-insertions that create LCB. This combination of a homogeneous, continuous, solution process at higher temperatures helped to ensure that the products had narrow composition and sequence distributions, but higher long chain branching content as measured by MIR (I21/I2).

The hexane solvent was purified over beds of 3 A mole sieves and basic alumina. Ethylene and octene were dried over beds of 3 A mole sieves only. All feeds were pumped into the reactors by metering pumps, except for the ethylene, which flowed as a gas through a mass flow meter/controller. Reactor temperature was controlled adiabatically by controlled chilling of the feeds and using the heat of polymerization to heat the reactor. Feed temperature can range from −20° C. to 40° C. or higher. Typical feed temperatures are kept at 10° C. for high conversion runs and as high as 25° C. for high temperature runs.

The reactors were maintained at a pressure in excess of the vapor pressure of the reactant mixture to keep the reactants in the liquid phase. In this manner the reactors were operated liquid full in a homogeneous single phase. Ethylene and propylene feeds were combined into one stream and then mixed with a pre-chilled hexane stream. A hexane solution of a tri-n-octyl aluminum scavenger was added to the combined solvent and monomer stream just before it entered the reactor to further reduce the concentration of any catalyst poisons. A mixture of the catalyst components in solvent was pumped separately to the reactor and entered through a separate port.

The reaction mixture was stirred aggressively using a magna-drive system with three directionally opposed tilt paddle stirrers set to about 750 rpm to provide thorough mixing over a broad range of solution viscosities. Flow rates were set to maintain an average residence time in the reactor of about 10 minutes. On exiting the reactor the copolymer mixture was subjected to quenching, a series of concentration steps, heat and vacuum stripping and pelletization.

The general conditions may be as described in WO 99/45041 incorporated herein for US purposes. Water is then supplied to kill the polymerization reaction, which might otherwise continue in the presence of surviving catalyst, unreacted monomer, and elevated temperature.

To obtain the highly branched polymers of the invention, the temperature is raised to an extra-elevated level by the use of a selected catalyst system. The catalyst system is selected to provide a good high temperature stability and to incorporate comonomer and macromer readily. By using the higher temperatures differences in incorporation of comonomers and/or macromers due to molecular size are reduced favoring LCB production. In addition monomer and comonomer conversion can be increased limiting the amount of monomer and comonomer available for polymerization and again favoring macromer incorporation and LCB formation.

Increased temperatures can be reached in adiabatic operation by increasing the amount of monomer and comonomer converted to polymer per unit time using increased levels of catalyst and increased monomer concentrations. Increased polymerization temperatures may themselves be associated with increased activity so that the catalyst addition rate may need to be changed to reach stable operating conditions. Increased monomer conversions may be reached by increasing catalyst levels or increasing the reactor residence times without increasing the monomer concentration so that monomer is consumed to a greater extent and its concentration lowered. Optimally the catalyst system is selected to permit both higher monomer conversion and maintained or improved operating temperatures.

The effluent of the continuous stirred tank reactor is passed to heat exchangers to raise the temperature to 220° C. Liquid phase separation is then effected by a rapid pressure drop as the polymerization mixture passes through a let-down valve in a liquid phase separation vessel, in which the pressure drops quickly from 100 Bar to 40 Bar. Inside the vessel an upper lean phase is formed with less than 0.1 wt % of polymer and a lower polymer rich phase with 30 to 40 wt % of polymer. The concentration in the polymer rich phase is approximately double to triple that in the polymerization effluent. After further removal of solvent and monomer in a low-pressure separator and devolatilizer, pelletized polymer can be removed from the plant.

The lean phase and volatiles removed downstream of the liquid phase separation are recycled to be part of the polymerization feed. In the process a degree of separation and purification takes place to remove polar impurities that might undermine the activity of the catalyst. Any internally unsaturated olefins, which are difficult to polymerize would gradually build up in the lean phase and recycle streams. Any adverse effects on the polymerization activity, may be mitigated by removing these olefins from the recycle stream and/or encouraging their incorporation in the polymer, favored by high polymerization temperatures.

The following runs were performed with the following catalyst systems:

TABLE 2

| Catalyst system | Transition metal component (TM) | Activator Component (NCA) | Scavenger component |
|---|---|---|---|
| (A) | Dimethyl silyl bis(indenyl) hafnium dimethyl | Dimethyl anilinium tetrakis (heptafluoro-naphthyl) borate | Tri-n-octyl aluminum |
| (B) | (p-Et$_3$Si-phenyl)$_2$C (2,7'Bu)$_2$Flu)(Cp) HfMe$_2$ | Dimethyl anilinium tetrakis (heptafluoro-naphthyl) borate | Tri-n-octyl aluminum |
| (C) | (p-Et$_3$Si-phenyl)$_2$C (2,7'Bu)$_2$Flu)(Cp) HfMe$_2$ | Dimethyl anilinium tetrakis (pentafluorophenyl) borate | Tri-n-octyl aluminum |

Plastomers are made in a number of runs using the process generally described previously and the indicated catalyst systems.

TABLE 3

| Run | Co-monomer | Cat/Act | C$^2$ wt % | Density | MI | MIR |
|---|---|---|---|---|---|---|
| I | Propylene | (A) | 73.4 | 0.872 | 0.96 | 52.9 |
| II | Propylene | (A) | 74.6 | 0.875 | 1.18 | 46.3 |
| III | Propylene | (B) | 73.3 | 0.871 | 1.21 | 64.2 |
| IV Comp. | Octene | (C) | 67.5 | 0.872 | 3.8 | 36.4 |
| V Comp. | Octene | (C) | 72.9 | 0.885 | 1.0 | 44.2 |

No hydrogen was added. The process conditions in the runs were either varied to achieve the target MI by adjusting the temperature OR by adjusting the monomer conversions as shown in the following details. The process conditions are summarized in Table 4.

TABLE 4

(Average values from experimental runs)

| Run | Process Control | $C^2$ conversion | $C^3$ conversion | Rx Temp | Production Rate | g polymer/g TM |
|---|---|---|---|---|---|---|
| I | High Conversion | 84.7% | 43.3%. | 146° C. | 11.6 Kg/hr | 250 000 |
| II | High Rx Temp | 70.0% | 27.5%. | 156° C. | 9.8 Kg/hr | 422 000 |
| III | High Conversion and High Temperature | 90.4%. | 56.3%. | 160° C. | 12.4 Kg/hr | 203 000 |
| IV Comp | High Conversion | 90.9% | 59.9% | 145.5° C. | 12.1 Kg/hr | 103 000 |
| V Comp. | High temperature | 84.0%. | 48.2%. | 153.5° C. | 11.7 Kg/hr | 110 000 |
| VI | Typical run (not according to invention) | 76% | 38% | 130° C. | Not available | 90 000 |

Octene used as comonomer may include isomers, which have a negative effect on activity.

TABLE 5

(Specific values from samples during run)

| Sample No | Catalyst type | Monomer feed | Process Control | MI(190° C., 2.16 kg) | MIR ($I_{21}/I_2$). | Activity g poly./g TM | ICP Boron ppm | ICP Hafnium ppm |
|---|---|---|---|---|---|---|---|---|
| I | (A) | $C^2 + C^3$ | High conversion | 0.98 | 54.03 | 268 800 | N/A | N/A |
| II | (A) | $C^2 + C^3$ | High reaction temp | 1.25 | 43.35 | 425 000 | <0.22 | 0.826 |
| HI | (B) | $C^2 + C^3$ | High conversion | 1.56 | 78.66 | 204 700 | | N/A |
| VI Comp. | (C) | $C^2 + C^8$ | Typical run (not acc. to invention) | 1.06 | 28.76 | 90 000 | 0.14* | 2.1* |

*not measured by ICP, calculated on a 100% inclusion of catalyst residue in polymer.

Table 4 illustrates that using the dimethyl anilinium tetrakis (pentafluorophenyl) borate as NCA, leads to low activities and hence negative impact on electrical properties (run 4 and 5). (p-Et$^3$Si-phenyl)2C(2,7tBu)2Flu)(Cp)HfMe2 provides a higher conversion and promotes a high MIR ($I^{21}/I^2$) value. Using a catalyst system with a chiral or achiral hafnocene hence permits the production of a polymer, which has a commercial MI range, a high MIR ($I^{21}/I^2$) and a low catalyst residue in the polymer.

Example I shows a high conversion and reasonable activity. The MIR (I21/I2) was 53. Example II is made at a high polymerization temperature at some reduction in conversion. The MIR (I21/I2) at 46 remains high and activity is much higher than for I. Example III shows that the use of catalyst (B) permits a higher conversion/temperature balance than catalyst (A) at comparable activity. The choice of process conditions and catalyst permits the combination of a high conversion, high polymerization temperature and high MIR (I21/I2). Example IV and V show that using octene-1 as a comonomer does not permit a good combination of high activity and high MIR (I21/I2).

Blend with the Interpolymers with EP-VNB

Table 6 contains a list of the ethylene α-olefin polymers used in the medium voltage electrical formulation also containing Vistalon V1703P commercially available from ExxonMobil Chemical company. This polymer contains vinyl norbornene (VNB) as the termonomer and is highly branched.

TABLE 6

POLYMER CHARACTERISTICS

| Polymer type | | $C^2$ (wt. %) | g/ml | MI (g/10 min) | MIR ($I_{21}/I_2$) | ML (I + 4) 125° C. (MU) | Diene Type | Diene (wt. %) |
|---|---|---|---|---|---|---|---|---|
| Vistalon® 1703P | $C^3$ | 76 | 0.870 | | | 25 | VNB | 0.9 |
| III | $C^3$ | 73.6 | 0.872 | 1.3 | 68 | | None | None |
| Engage 8100 | $C^8$ | 62 | 0.870 | 1.0 | 28 | 23 | None | None |

Metallocene polymers IV and VI are comparative ethylene octene polymers made with dimethyl anilinium tetrakis (pentafluorophenyl) borate as an activator at a density of 0.870. III is an inventive ethylene propylene copolymer prepared using a metallocene catalyst and dimethyl anilinium tetrakis (heptafluoro-naphthyl) borate as activator. Engage 8100 is an ethylene octene copolymer commercially available from DuPont Dow Elastomers LLC.

Table 7 shows an industry standard medium voltage insulation compound containing 60 parts of clay as filler.

TABLE 7

MEDIUM VOLTAGE COMPOUND FORMULATION

| Components | Description | Formulation (phr) |
|---|---|---|
| Polymer[1] | | 100 |
| Translink 37 Clay | Calcined Clay | 60 |
| Agerite MA | Antioxidant | 1.5 |
| Drimix A 172 | Vinyl Silane | 1.0 |
| Zinc Oxide | | 5.0 |
| ERD 90 | Red Lead | 5.0 |
| Escorene LD 400 | Low Density Polyethylene | 5.0 |
| Paraffin 1236 | Wax | 6.0 |
| Curatives | | |
| DiCup 40 KE | Dicumyl Peroxide (40% Active) | 6.5 |

[1] III + V 1703P

The clay, Translink 37 is calcined, surface treated Kaolin available from Engelhard Corp. The formulations were compounded using a two pass mixing protocol in a 1600 ml. Banbury mixer using a batch weight of 1420 g, which corresponds to a fill factor of 75%. The masterbatch compound without the peroxide was mixed in the first pass for a total mixing time of 7 minutes following the mixing procedure shown in Table 8. The masterbatch discharged from the Banbury mixer was sheeted out on a two-roll mill. The batch was homogenized several times on the mill. The mill temperature was maintained around 90° C. during mixing. The milled masterbatch was cut into small strips using a mill knife. The strips were introduced again into the mixer along with the peroxide, and the compound was mixed for further two minutes at temperatures less than 125° C. The final compound was homogenized once again on the two-roll mill and granulated into small pieces for extrusion processing.

Table 8 shows the mixing procedures and conditions.

TABLE 8

MIXING PROCEDURE
Equipment: 1600 cc.
Banbury Batch Size: 1420 gm

| Time (minutes) | Rotor Speed (rpm) | Ingredients Addition |
|---|---|---|
| 0 | 85 | Polymer + Agerite |
| 0.5 | 85 | ½ Clay, Zinc Oxide ERD 90, ½ Drimix LD 400 |
| 2.0 | 100 | ¼ Clay, ¼ Drimix, ½ Wax |
| 3.0 | 100 | ¼ Clay, ¼ Drimix, ½ Wax |
| 4.0 | 100 | Sweep |
| 5.5 | 100 | Sweep |
| 7.0 | | Dump |

Compound extrusion studies were performed in a HAAKE Rheocord 90 single screw extruder. The screw length to diameter (L/D) for this extruder is 20/1. The extruder screw has a compression ratio of 2/1, which is typical for processing rubber compounds. A cylindrical die with a land length of 9.5 mm and diameter of 3.2 mm was used to assess surface appearance of the extrudates. The various zones of the extruder and the die block temperature are maintained constant at 125° C. Granulated rubber is fed through the extruder hopper to maintain a full screw, but an empty hopper during extrusion. The extruder screw speed is varied from 25 RPM to 100 rpm. The mass throughput is measured at every screw speed by collecting a sample of the extrudate over a specific length of time, typically 10 to 30 seconds depending on the screw speed. At least three samples are collected to provide an average value.

The surface roughness of the extrudate is analyzed using a Surfcom 110 surface gauge. The Surfcom instrument is equipped with a diamond stylus that traverses over the surface of the extrudate under examination, recording the surface irregularities. The vertical distance between the highest and lowest point in a surface irregularity, denoted as Rt (μm) is measured for every sample. The arithmetic mean Ra, denoting the departure of the surface profile from a mean line is also recorded (μm). An average value is obtained based on at least 3 measurements per sample.

The variation of compound viscosity with frequency was measured using a RPA 2000 Rubber Process Analyzer. The measurements were made at a constant strain of 14% and temperature of 125° C. The frequency was varied from 0.21 to 219 (l/sec).

Table 9 shows the compound cure and physical properties of medium voltage compound formulations, prepared as outlined in Tables 7 and 8, containing the EP(D)M-VNB terpolymer V 1703P by itself and in blends with the metallocene ethylene propylene copolymer III.

TABLE 9

COMPOUND CURE CHARACTERISTICS
AND PHYSICAL PROPERTIES

| | | FORMULATION EXAMPLE | | | |
|---|---|---|---|---|---|
| | | 1 Comp | 2 | 3 | 4 |
| V 1703P | | 100 | 50 | 25 | |
| III | | 0 | 50 | 75 | 100 |
| CMPD. MOONEY VISCOSITY (ML) (1 + 4) 125 C. | MU | 22 | 22 | 21 | 18 |
| Mooney Scorch (Ms) 132 C. | | | | | |
| Min Value | MU | 10.8 | 10.6 | 9.8 | 8.4 |
| Time for 3 point rise | min | 14.2 | 18.5 | 20.5 | 21.7 |
| ODR 200 C. (392 F.), 3 deg, 6 min | | | | | |
| ML | dN-m | 6.1 | 6.3 | 5.9 | 5.1 |
| MH | dN-m | 94.1 | 83.6 | 76.3 | 69.0 |
| Ts2 | min | 0.63 | 0.62 | 0.65 | 0.65 |
| T90 | min | 1.84 | 1.86 | 1.94 | 2.0 |
| T98 | min | 2.38 | 2.36 | 2.43 | 2.47 |
| Rate | dN-m/min | 110.4 | 86.5 | 72.8 | 61.5 |
| MH-ML | dN-m | 88.0 | 77.3 | 70.5 | 63.9 |
| Press Cure, 20 min @ 165 C. (329 F.) | | | | | |
| Hardness | Shore A | 89 | 86 | 86 | 85 |
| 100% Modulus | MPa | 5.3 | 5.0 | 4.4 | 3.9 |
| 200% Modulus | MPa | 8.7 | 8.1 | 7.3 | 6.4 |
| 300% Modulus | MPa | 10.7 | | | 8.4 |
| Tensile Strength | MPa | 10.3 | 9.2 | 9.0 | 8.6 |
| Elongation | % | 287 | 263 | 267 | 303 |
| Heat Aging (14 d/ 150 C.) | | | | | |
| Hardness (oven #4) | Shore A | 88 | 86 | 86 | 84 |
| Hardness Change | Points | −1 | 0 | 0 | −1 |

TABLE 9-continued

COMPOUND CURE CHARACTERISTICS
AND PHYSICAL PROPERTIES

| | | FORMULATION EXAMPLE | | | |
|---|---|---|---|---|---|
| | | 1 Comp | 2 | 3 | 4 |
| Tensile Strength | MPa | 1451 | 1297 | 1278 | 1142 |
| Tensile Retain | % | 97 | 97 | 98 | 92 |
| Elongation | % | 267 | 282 | 299 | 359 |
| Elongation Retain | % | 93 | 107 | 112 | 118 |

Formulation example 1 is a comparative formulation, while Formulation examples 2 through 4 are inventive compounds. Substitution of V 1703P with the metallocene candidate III leads to a marginal decrease in cure rate from the replacement of the VNB terpolymer, but enhanced heat aged physical properties, notably elongation to break.

TABLE 10

| | | Example | | | |
|---|---|---|---|---|---|
| | | 1 Comp | 2 | 3 | 4 |
| V 1703P | | 100 | 50 | 25 | |
| III | | 0 | 50 | 75 | 100 |
| HAAKE Rheocord 125 C., Mass Rate | g/min | | | | |
| 25 RPM | | 36 | 39 | 34 | 34 |
| 50 RPM | | 65 | 51 | 69 | 51 |
| 75 RPM | | 110 | 100 | 107 | 103 |
| 100 RPM | | 122 | 93 | 108 | 106 |
| HAAKE Rheocord 125 C., $R_a$ | μm | | | | |
| 25 RPM | | 16 | 4 | 13 | 26 |
| 50 RPM | | 7 | 2 | 17 | 18 |
| 75 RPM | | 8 | 2 | 15 | 29 |
| 100 RPM | | 7 | 2 | 27 | 24 |
| HAAKE Rheocord 125 C., $R_t$ | μm | | | | |
| 25 RPM | | 75 | 26 | 76 | 154 |
| 50 RPM | | 44 | 16 | 111 | 113 |
| 75 RPM | | 50 | 17 | 83 | 154 |
| 100 RPM | | 42 | 18 | 181 | 147 |

At the 50/50 blend ratio of V 1703P to III in the compound (Formulation example 2), the extrudate surface properties are comparable to the comparative Example 1 formulated with the reference polymer V 1703P. With increasing metallocene polymer content in the formulation, melt fracture was noticed on the extrudates at extruder speed of 50 rpm and above. This is manifested by the relatively high Rt values for Examples 3 and 4.

FIG. 1 shows the variation of the compound dissipation (or loss) factor with time on samples that were aged in water at 90° C. The performance of the inventive formulations 2 through 4 is very similar to the comparative formulation example 1.

Figure 2:
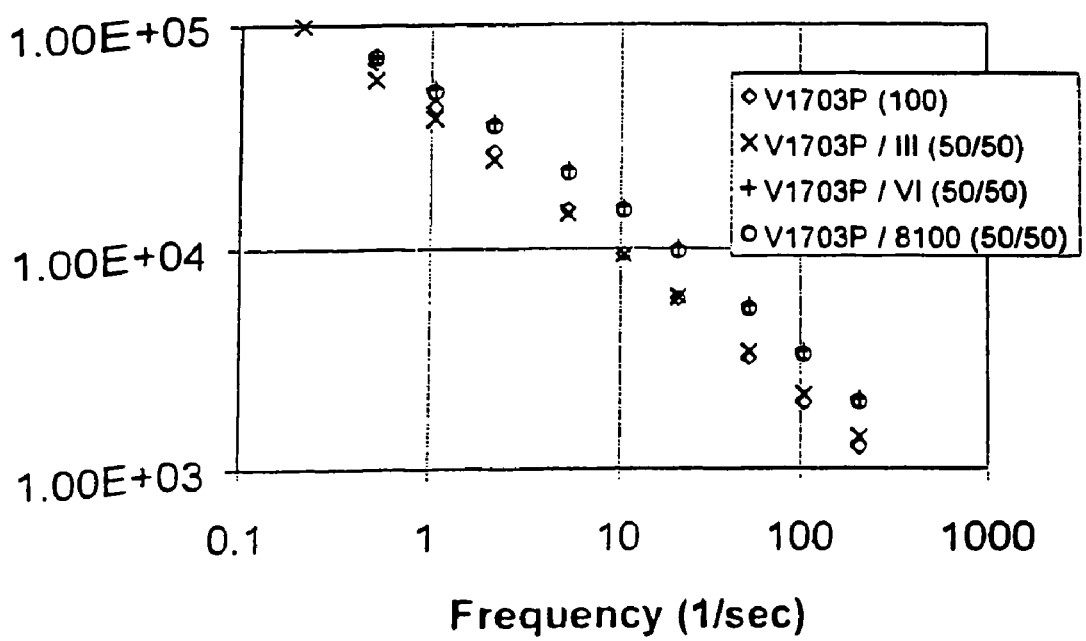
FIG. 2 shows the variation of compound viscosity versus frequency, according to one or more embodiments described.

FIG. 2 shows the variation of compound viscosity with frequency in formulations featuring the reference polymer V 1703P by itself, and in 50/50 blends with the metallocene candidate III and comparative metallocene polymers PX-3 and ENGAGE 8100. The extensive branching in the reference polymer V 1703P makes the compound containing this polymer most shear sensitive resulting in the lowest compound viscosity at the higher frequency range of 100 to 250 sec-1. The compounds featuring the comparative polymers VI and ENGAGE 8100 are the least shear sensitive. These formulations would be somewhat defensive in processability displaying melt fracture characteristics at low shear stress. The formulation featuring the metallocene polymer III shows enhanced processability over the comparative VI and ENGAGE 8100 containing compounds. These interpolymers may be pelletized directly.

Formulation Examples 5 to 7

Medium voltage electrical compounds featuring polymer blends of the metallocene candidate III with V 1703P were formulated as per the formulation in Table 7, at varying blend ratios of III to V 1703 P. The formulations were granulated into fine pellets and extruded onto a 14 AWG copper wire.

Table 11 shows the process conditions for the wire line extrusion, which correspond to typical run conditions of the control compound featuring the V 1703P polymer. The medium voltage insulation compound coating the wire was vulcanized in the steam/water heated continues vulcanization tube maintained at a constant temperature of 208° C. Typical residence time in the vulcanization tube depends on the line speed. At a line speed of 12.2 m/min, the residence time is 1.65 minutes.

As seen in Table 11 all the inventive formulations varying in blend ratio of III to V 1703 P processed well at conditions similar to the control compound.

TABLE 11

WIRE LINE PROCESS CONDITIONS
M313101 corresponds to run III.

| | | EXAMPLE | | |
|---|---|---|---|---|
| | | 5 | 6 | 7 |
| M3013101/V 1703 P | Ratio | 100/0 | 75/25 | 50/50 |
| Body (Actual/Set) | C | 105/104 | 104/104 | 105/105 |
| Die | C | 103/102 | 105/105 | 112/102 |
| Zone 1 | C | 99/99 | 98/98 | 98/98 |
| Zone 2 | C | 100/100 | 100/100 | 100/100 |
| Zone 3 | C | 102/102 | 102/102 | 102/102 |
| Clamp | C | 102/102 | 102/102 | 103/103 |
| Flange | C | 103/102 | 105/105 | 102/102 |
| Melt Temperature | C | 116 | 117 | 115 |
| Line Speed | m/min | 12.2 | 12.2 | 12.2 |
| Line Speed Master | % | 88 | 88 | 88 |
| Extruder Ref | % | 75 | 75 | 70 |
| Capstan Ref | % | 55 | 55 | 55 |
| Extruder RPM | RPM | 66 | 66 | 61.7 |
| Extruder Head Pressure | MPa | 14.5-18.6 | 17.2-22.1 | 14.5-19.3 |
| Steam Pressure | MPa | 1.72 | 1.72 | 1.72 |
| CV Cure Temp | C. | 208 | 208 | 208 |
| Water Level | m | 6.4 | 6.4 | 6.4 |

Table 12 shows the physical properties of the wire samples of Table 11 containing varying blend ratios of the metallocene candidate M3013101 to V 1703P. Formulation example 8 is the control formulation featuring V 1703P without the metallocene candidate. As seen in Table 12, the surface roughness of the wire samples (Rt) is nearly the same in all the compounds. The melt fracture seen in Formulation examples 5 and 6 on extruded compounds (Table 10) is eliminated by the application of steam in the continuous vulcanization tube. All the example formulations 5 though 7 achieve close to 90% cure, comparable to the control Example 8. The tensile strength of the inventive compounds is slightly lower than the control, but this level is adequate for the end use application.

TABLE 12

PROPERTIES OF EXTRUDED WIRE

|  |  | EXAMPLE | | | |
| --- | --- | --- | --- | --- | --- |
|  |  | 5 | 6 | 7 | 8 |
| M3013101/V 1703P |  | 100/0 | 75/25 | 50/50 | 0/100 |
| Line Speed | m/min | 12.2 | 12.2 | 12.2 | 13.4 |
| Cure Temperature | ° C. | 208 | 208 | 208 | 208 |
| Wire Surface Roughness | μm |  |  |  |  |
| Ra |  | 1.75 | 1.39 | 1.88 | 1.43 |
| Rt |  | 19.22 | 16.27 | 20.57 | 12.38 |
| Ra + 0.1 Rt |  | 3.67 | 3.02 | 3.94 | 2.67 |
| Cross Linked Material | % | 90 | 92 | 88 | 90 |
| 100% Modulus | MPa | 2.1 | 2.3 | 2.6 | 3.3 |
| 200% Modulus | MPa | 2.7 | 3.0 | 3.4 | 4.1 |
| Tensile Strength | MPa | 9.0 | 8.6 | 9.4 | 11.0 |
| Elongation | % | 390 | 299 | 292 | 291 |
| Break Down Strength | KV/mm | 33 | 33 | 31 | 56 |

In certain embodiments, the processes. Polymers, and formulations described herein enable the production of compositions and electrical devices capable of exhibiting beneficial electrical properties in the absence of a lead oxide compound or at reduced levels of a lead oxide compound. Specifically, in certain embodiments, the beneficial electrical properties are dissipation factors and dielectric constants. A series of experimental evaluations were conducted to evaluate these electrical properties for formulations incorporating certain polymeric materials described herein.

Table 13 lists three medium voltage compound formulations, prepared as outlined in Tables 7 and 8, for which the electrical properties were evaluated. Each formulation includes an ethylene interpolymer identified as Polymer IV or Polymer V.

Polymer IV is an EPDM terpolymer produced in a Ziegler-Natta catalyzed polymerization. Polymer IV has a Mooney viscosity of ML (1+4) at 125° C. of 25. The terpolymer incorporates ethylene, propylene, and ethylidene at weight percentages of 73.3 wt. %, 23.4 wt. %, and 3.3 wt. %, respectively. Polymer IV is commercially available from ExxonMobil Chemical under the designation Vistalon® 8731.

Polymer V is an EPM copolymer (ethylene-propylene copolymer) produced using a continuous polymerization process incorporating a metallocene catalyst and dimethyl anilinium tetrakis (heptafluoro-naphthyl) borate as activator. Polymer V has a Mooney viscosity of ML (1+4) at 125° C. of 16 and a melt index of 1 (g/10 min.). Polymer V incorporates ethylene and propylene at weight percentages of 72 wt. % and 28 wt. % respectively.

TABLE 13

| Components | Example 9 (phr) | Example 10 (phr) | Example 11 (phr) |
| --- | --- | --- | --- |
| Polymer IV | 100 | 100 | 0 |
| Polymer V | 0 | 0 | 100 |
| Translink 37 clay | 60 | 60 | 60 |
| Zinc oxide | 5 | 5 | 5 |
| ERD 90 | 0 | 5 | 0 |
| Paraffin wax | 5 | 5 | 5 |
| Escorene LD 400 | 5 | 5 | 5 |
| Agerite Resin D | 1.5 | 1.5 | 1.5 |
| Drimix A 172 Silane | 1 | 1 | 1 |
| DiCup 40KE | 6.5 | 6.5 | 6.5 |
| Total phr | 184 | 189 | 184 |

Curing conditions for all formulations was 20 minutes at 165° C

Dissipation factors for Examples 9-11 were determined over time as reported in Table 14. Dissipation factors were determined after aging in water at 90° C. in accordance with ASTM D-150-98.

TABLE 14

| Time | Example 9 | Example 10 | Example 11 |
| --- | --- | --- | --- |
| 0 | 0.0054 | 0.0055 | 0.0054 |
| 1 day | 0.0169 | 0.0165 | 0.0118 |
| 8 days | 0.0249 | 0.0153 | 0.0106 |
| 14 days | 0.0243 | 0.0160 | 0.0111 |
| 21 days | 0.0233 | 0.0146 | 0.0116 |
| 28 | 0.0242 | 0.0127 | 0.0113 |

600 volts, ASTM tensile pad

Figure 3:
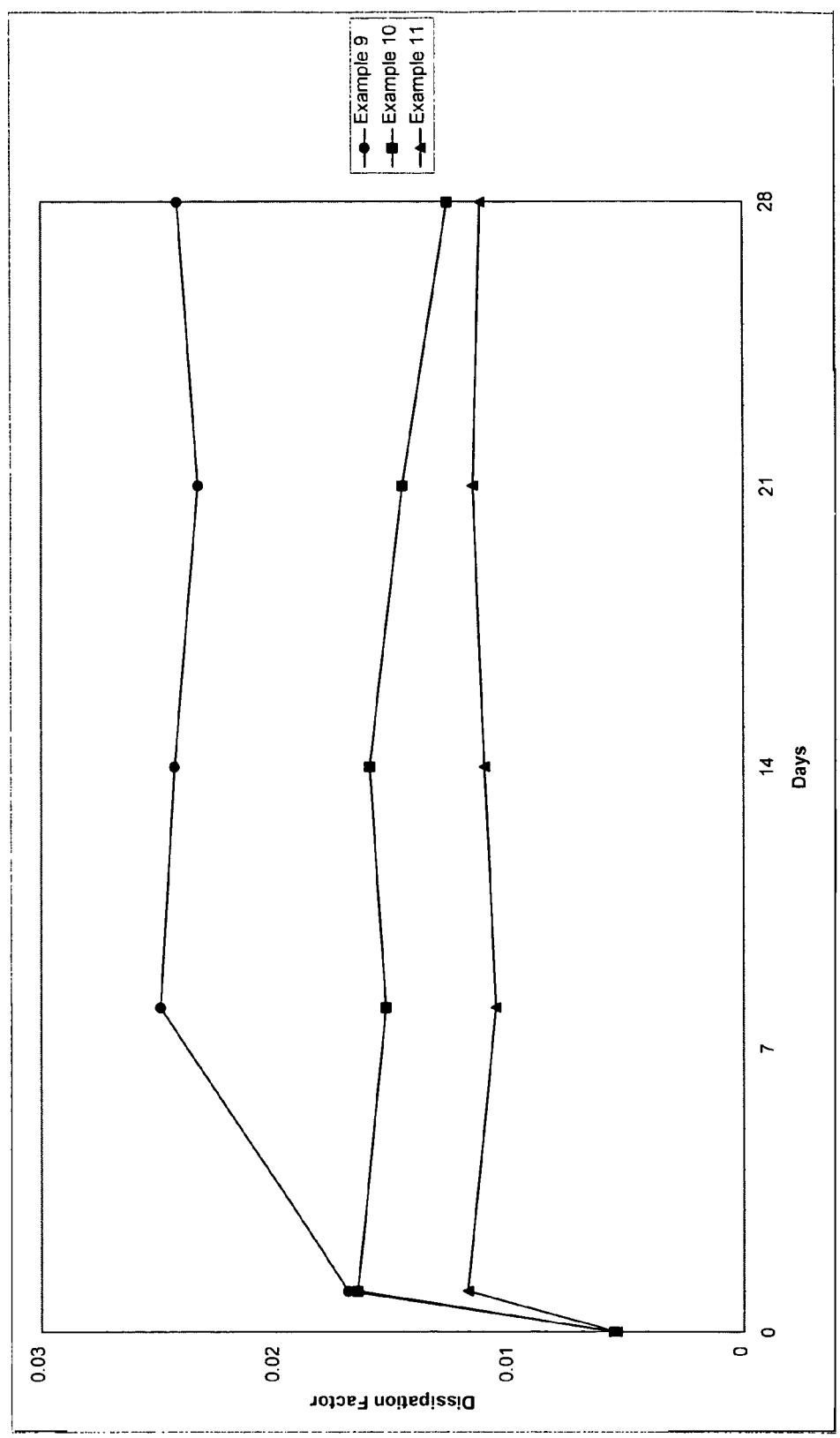
FIG. 3 shows dissipation factors versus time for certain compounds, according to one or more embodiments described.

Generally, the lower the dissipation factor, the better the electrical property of the formulation. For ease of analysis, the dissipation factors over time for the formulations of Examples 9-11 are plotted in FIG. 3. As seen by reference to Table 14 and FIG. 3, the formulation incorporating Polymer IV demonstrated improved dissipation factor properties resulting from the inclusion of 5 phr of a lead oxide compound (ERD 90). However, the formulation of Example 11, incorporating metallocene catalyzed Polymer V, demonstrated superior dissipation factor performance even without the addition of or presence of lead, or a derivative thereof, such as a lead oxide compound.

In certain embodiments, the formulations described herein are substantially free of lead, and derivatives thereof. For purposes of this disclosure, the term substantially free of lead and derivatives thereof shall mean formulations having less than 0.1 phr lead and/or derivatives thereof, including, but not limited to lead oxides, per 100 phr polymeric material(s) in the composition. In certain embodiments, the formulations described herein are substantially free of lead, and derivatives thereof and have dissipation factors of less than 0.02 after aging for 28 days in water at 90° C. In other embodiments, the formulations described herein are substantially free of lead, and derivatives thereof, and have dissipation factors of less than 0.15 after aging for 28 days in water at 90° C. In still other embodiments, the formulations described herein are substantially free of lead, and derivatives thereof, and have dissipation factors of less than 0.13 after aging for 28 days in water at 90° C.

Dielectric constant values of the formulations of Examples 9-11 were determined over time as reported in Table 15. Dielectric constant values were determined after aging in water at 90° C. in accordance with ASTM D-150-98.

TABLE 15

| Time | Example 9 | Example 10 | Example 11 |
| --- | --- | --- | --- |
| 0 | 2.58 | 2.58 | 2.57 |
| 1 day | 2.45 | 2.50 | 2.37 |
| 8 days | 2.53 | 2.53 | 2.39 |
| 14 days | 2.54 | 2.54 | 2.39 |
| 21 days | 2.58 | 2.56 | 2.40 |
| 28 | 2.59 | 2.56 | 2.42 |

600 volts, ASTM tensile pad

Generally, the lower the dielectric constant, the better the electrical property of the formulation. The formulations of Examples 9 and 10, incorporating Polymer IV, with and without incorporation a lead oxide, exhibited relatively stable dielectric constants over the 28-day period. The formulation of Example 11, incorporating the metallocene catalyzed copolymer, Polymer V, and no added lead oxide, demonstrated a superior lower dielectric constant after one day and a favorable dielectric constant reduction of more than 5% by the end of the 28 day period.

In certain embodiments, the formulations described herein are substantially free of lead, and derivatives thereof, and have dielectric constant values of less than 2.55 after aging for 28 days in water at 90° C. In other embodiments, the formulations described herein are substantially free of lead, and derivatives thereof, and have dielectric constant values of less than 2.50 after aging for 28 days in water at 90° C. In still other embodiments, the formulations described herein are substantially free of lead, and derivatives thereof, and have dielectric constant values of less than 2.45 after aging for 28 days in water at 90° C.

Tradenames used herein are indicated by a ™ symbol, or an ® symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

When numerical lower limits and numerical upper limits are listed herein, ranges from any lower limit to any upper limit are contemplated.

We claim:

1. An electrical device comprising:
   (A) an electrical conductor, and
   (B) a polymeric insulating layer comprising:
      (i) from 50 to 100 wt %, by weight of the interpolymer and the terpolymer, of an ethylene interpolymer containing units derived from propylene, having:
         (a) a density of from 0.85 to 0.9 g/cm$^3$,
         (b) an MI of from 0.01 to 2 g/10 min, and
         (c) an MIR ($I_{21}/I_2$) of from 40 to 80, and wherein the ethylene interpolymer:
            (i) is obtained by solution polymerization using transition metal complex as a catalyst and a boron-containing non-coordinating anion, and
            (ii) has an undetectable level of NCA derived residue, as determined by boron content, as determined by ICP;
      (ii) from 0 to 50 wt %, by weight of the interpolymer and the terpolymer, of an ethylene-propylene-vinyl norbornene terpolymer; and
      (iii) a clay, flame retardant and/or an inorganic filler.

2. The electrical device of claim 1, wherein the terpolymer has a content of ethylene derived units of from 68-75 wt %, a molecular weight distribution Mw/Mn as determined by GPC of at least 5 and contains from 0.1 to 2.5 wt % of units derived from VNB.

3. The electrical device of claim 1, wherein the insulating layer has a tensile strength of from 5 to 10 MPa, a break elongation of from 100 to 500% and a dielectric constant of less than 5.

4. The electrical device of claim 1, wherein the insulating layer has a tensile strength of from 5 to 10 MPa, a break elongation of from 150 to 400% and a dielectric constant of less than 3.

5. An electrical device comprising:
   A. an electrical conductor, and
   B. a polymeric insulating layer comprising:
      (i) from 50 to 100 wt %, by weight of the interpolymer and the terpolymer, of an ethylene interpolymer comprising:
         (a) at least 55 mol % of ethylene derived units; and
         (b) a balance of units derived from:
            (1) propylene,
            (2) from 0 to less than 5 mol % of a α-olefin comonomer other than propylene, and
            (3) from 0 to less than 0.1 mol % of a diene,
         the ethylene interpolymer having:
            (a) a density of from 0.85 to 0.9 g/cm$^3$,
            (b) an MI of from 0.01 to 2 g/10 min, and
            (c) an MIR ($I_{21}/I_2$) of from 40 to 80, and
         wherein the ethylene interpolymer:
            (a) is obtained by solution polymerization using transition metal complex as a catalyst and a boron-containing non-coordinating anion,
            (b) has an undetectable level of NCA derived residue as determined by boron content, as determined by ICP, and
            (c) a level of single site catalyst residue, as measured by the content of transition metal, of less than 2 ppm as determined by ICP;
      (ii) from 0 to 50 wt %, by weight of the interpolymer and the terpolymer, of an ethylene propylene terpolymer elastomer with:
         (a) a Mooney range of from 20 to 50,
         (b) a content of ethylene derived units of from 68-75 wt %,
         (c) a molecular weight distribution Mw/Mn of at least 5, and
         (d) from 0.1 to 2.5 wt % of units derived from VNB; and
      (iii) a clay, flame retardant and/or an inorganic filler.

6. A polymeric composition comprising:
   (i) from 50 to 100 wt %, by weight of the interpolymer and the terpolymer, of an ethylene interpolymer containing as α-olefin comonomer propylene, said ethylene interpolymer having:
      (a) a density of from 0.85 to 0.9 g/cm$^3$,
      (b) an MI of from 0.01 to 2 g/10 min, and
      (c) an $I_{21}/I_2$ of from 40 to 80,
   said ethylene interpolymer obtained by solution polymerization using a transition metal complex as a catalyst and a boron-containing non-coordinating anion to provide an undetectable level of NCA derived residue, as determined by boron content, as determined by ICP;
   (ii) from 0 to 50 wt %, by weight of the interpolymer and the terpolymer, of an ethylene-propylene-vinyl norbornene terpolymer; and
   (iii) a clay, flame retardant and/or an inorganic filler.

7. The polymeric composition according to claim 6, wherein the MI of the interpolymer is from 0.01 to 0.55 and the $I_{21}/I_2 > -90.9 \times MI + 90$.

8. The polymeric composition according to claim 6, wherein the interpolymer contains at least 55 mol % of ethylene derived units.

9. The polymeric composition according to claim 6, wherein the interpolymer contains at least 70 mol % ethylene derived units.

10. The polymeric composition according to claim 6, wherein the interpolymer has an MI of from 0.01 to 2 and an $I_{21}/I_2$ of from 40 to 60.

11. The polymeric composition according to claim 6, wherein the interpolymer has an MI of from 0.01 to 0.30 and an $I_{21}/I_2 > -103.45 \times MI + 91.0$.

12. The polymeric composition according to claim 6, wherein the interpolymer has an MI of from 0.01 to 0.30 and an $I_{21}/I_2 < -103.45 \times MI + 241.0$.

13. The polymeric composition according to claim 6, wherein the interpolymer has an MI of from 0.30 to 1.40 and an $I_{21}/I_2 > -18.18 \times MI + 65.4$.

14. The polymeric composition according to claim 6, wherein the interpolymer has an MI of from 0.30 to 1.40 and an $I_{21}/I_2 < -18.18 \times MI + 215.4$.

15. The polymeric composition according to claim 6, wherein the transition metal complex comprises Zr or Hf.

16. The polymeric composition according to claim 6, wherein the level of transition metal complex residue as measured by the content of transition metal is less than 2 ppm as determined by ICP.

17. The polymeric composition according to claim 6, wherein the level of transition metal complex residue as measured by the content of transition metal is less than 1 ppm as determined by ICP.

18. The polymeric composition according to claim 6, wherein the density of the interpolymer is at least 0.86 and/or less than 0.89.

19. The polymeric composition according to claim 16 wherein the density of the interpolymer is at least 0.87 and/or less than 0.88.

20. The polymeric composition according to claim 6, wherein the polymer contains less than 0.1 wt % of an anti-agglomeration additive.

21. The polymeric composition according to claim 6, wherein the polymeric composition has a dissipation factor of less than 0.02 after aging for 28 days.

22. The polymeric composition according to claim 6, wherein the polymeric composition has a dielectric constant value of less than 2.50 after aging for 28 days.

23. An electrical device comprising an electrical conductor and a polymeric insulating layer comprising a polymeric composition according to claim 6.

24. An electrical device comprising:
(A) an electrical conductor, and
(B) a polymeric insulating layer comprising a polymer or a polymeric composition, comprising:
(i) from 50 to 100 wt %, by weight of the interpolymer and terpolymer, of an ethylene interpolymer containing as α-olefin comonomer propylene, said ethylene interpolymer having:
(a) a density of from 0.85 to 0.9 g/cm$^3$,
(b) an MI of from 0.01 to 2 g/10 min, and
(c) an $I_{21}/I_2$ of from 40 to 80,
said ethylene interpolymer obtained by solution polymerization using a transition metal complex as a catalyst and a boron-containing non-coordinating anion to provide an undetectable level of NCA derived residue, as determined by boron content, as determined by ICP;
(ii) from 0 to 50 wt %, by weight of the interpolymer and terpolymer, of an ethylene-propylene-vinyl norbornene terpolymer having:
(a) a content of ethylene derived units of from 68-75 wt. %,
(b) a molecular weight distribution Mw/Mn of at least 5, and
(c) a content from 0.1 to 2.5 wt % of units derived from VNB; and
(iii) a clay, flame retardant and/or an inorganic filler.

25. An electrical device according to claim 24 wherein the insulating layer has a tensile strength of from 5 to 10 MPa, a break elongation of from 100 to 500% and a dielectric constant of less than 5.

* * * * *